United States Patent [19]
Patten

[11] 3,849,650
[45] Nov. 19, 1974

[54] AUTOMATIC X-RAY INSPECTION SYSTEM
[75] Inventor: Thomas Patten, San Jose, Calif.
[73] Assignee: Picker Corporation, Cleveland, Ohio
[22] Filed: Mar. 29, 1973
[21] Appl. No.: 346,091

[52] U.S. Cl. .............................. 250/321, 250/323
[51] Int. Cl. ............................................ H04b 1/38
[58] Field of Search ........... 250/321, 336, 272, 323; 178/6.8, 7.1

[56] References Cited
UNITED STATES PATENTS

| | | | |
|---|---|---|---|
| 3,280,253 | 10/1966 | McMaster et al. | 178/6.8 |
| 3,342,933 | 9/1967 | Zieler et al. | 178/7.1 |
| 3,535,443 | 10/1970 | Ricke | 178/6.8 |
| 3,567,854 | 3/1971 | Tschantz | 178/6.8 |
| 3,580,997 | 5/1971 | Webb | 250/321 |
| 3,582,651 | 6/1971 | Siedband | 178/6.8 |
| 3,673,317 | 6/1972 | Newell et. al. | 178/6.8 |
| 3,675,201 | 7/1972 | McKissick et al. | 178/7.1 |
| 3,699,691 | 9/1972 | Pattantyus | 178/6.8 |
| 3,718,757 | 2/1973 | Gulitz | 178/6.8 |
| 3,745,245 | 7/1973 | Yunde et al. | 178/6.8 |

*Primary Examiner*—James W. Lawrence
*Assistant Examiner*—B. C. Anderson
*Attorney, Agent, or Firm*—Watts, Hoffmann, Fisher & Heinke

[57] ABSTRACT

An X-ray system for automatically inspecting a test object. The inspection system includes a source of X-rays for irradiating the object, a video system for converting an image produced by the irradiated object to video signals representative of the image, and processor circuitry for electronically analyzing the video signals. The processor circuitry includes circuitry for activating a video gating circuit in response to the receipt of a predetermined number of horizontal lines and at a preselected segment of the horizontal line. The video signals occurring during that segment of the horizontal line are applied to circuitry for digitizing the video signals and comparing the digitized signals with reference signals of preset minimum and maximum values. In the event the value of the digitized signals is greater than the maximum value reference signal or less than the minimum value reference signal, a reject signal is developed by error detection circuitry.

21 Claims, 5 Drawing Figures

3,849,650

AUTOMATIC X-RAY INSPECTION SYSTEM

BACKGROUND OF THE INVENTION

This invention pertains to the art of object inspection systems, and more particularly, to X-ray inspection systems having circuitry for automatically developing a reject signal if a measured parameter of an object is not within prescribed tolerances.

Radiography has been an important technique for the inspection of materials and objects in order to detect internal voids and flaws which are not otherwise observable by visual inspection. Radiographic techniques have also been employed to measure various parameters, such as the dimensions of a test object, as well as for the visual inspection of the internal construction of an assembled device.

Most previous radiograph systems have required human visual interpretation of a radiograph. With these systems, an object is irradiated with a radiation source, such as an X-ray source, and a radiation sensitive film is positioned such that radiation passing through the object strikes the film. The film may then be developed and the image on the film may be visually inspected by a skilled radiologist in order to determine various characteristics with respect to measured parameters.

Fluoroscopy is frequently used as an adjunct to or alternate to radiography. With so-called bright fluoroscopy, an X-ray sensitive image intensifier system produces a visible light image. This visible light image is viewed in one of a combination of three ways. The three ways are (1) through a television system; (2) through a mirror system; (3) or photography. Even with the use of these devices, human interpretation of the image, or radiograph, is still necessary in order to evaluate the desired parameter.

As is apparent, the prior techniques of human interpretation of radiographs are relatively slow and have been found to be of only limited value for use in inspecting products which are manufactured on a production-line basis. In addition to the time required for such human interpretation, there is also the problem of reliability when one person interprets numerous similar displays which occur in rapid succession.

Video systems have been proposed for use with X-ray systems for automatically inspecting test objects. One example of such an automatic video systems is disclosed in U.S. Pat. No. 3,580,997 to T. E. Webb et al. and issued May 25, 1971. In the system disclosed in this patent, a television camera converts the radiographic density of a test object and a reference object into corresponding video signals. The camera also generates horizontal and vertical synch pulses, which are in turn used to blank out all of the areas of the camera field or view except for specific reference and inspection zones. The reference and inspection zones correspond to the positions of the test and reference objects in the camera field of view. The video signals representing the density of the reference and inspection zones are integrated and output voltages proportional to the average radiographic densities of the zones are compared. Thus, it is possible to automatically compare the radiation opaqueness of the test object with that of the reference object.

Previous video systems for automatically interpreting radiographic type data have been responsive to the average radiographic densities of a test object and a reference object, and have not been concerned with the problems of automatically detecting the misalignment of components within a manufactured assembly or with the automatic inspection of the dimensions of test objects, or characteristics of other such parameters of a test object.

SUMMARY OF THE INVENTION

The present invention is directed toward an automatic X-ray inspection system which may be used to automatically detect the misalignment of components, the fact that the dimensions of a test object are not within prescribed tolerances, the particular alignment and configuration of a flaw within an object, or other such parameters of a test object, thereby overcoming the noted disadvantages and others of such previous systems.

In the present invention there is the provision of a source of X-rays for irradiating an object under inspection and a video camera positioned to view an image resulting from the irradiation of the object. An imaging medium such as a fluorescent screen may be used to provide the necessary image. The video signals developed by the camera include horizontal and vertical synchronizing pulses which are utilized by a video processor circuit for providing automatic inspection of the object.

The processor circuit includes a line counter for developing a control signal upon the receipt of a preselected number of horizontal synchronizing pulses. In other words, the line counter is set to develop the control signal only at a single horizontal line, or at selected horizontal lines, at which measurements of the test object are to be taken. A line position generator is utilized to inhibit the passage of all portions of the preselected horizontal line or lines which are to be processed for inspection. The line counter circuit and the line position generator control the operation of a video gate in order to inhibit the passage of all video signals except the preselected segments of the preselected horizontal line or lines to be analyzed. The gated video information is then applied to a standardizer circuit for converting the video signals to digitized signals, or signals having a width proportional to the amplitude of the video signals. A pair of reference generator circuits are utilized to respectively develop narrow and wide limit reference signals. The digitized video signals and the reference signals are applied to comparison circuitry with the result that an error signal is generated if the width of one of the digitized signals is less than the narrow limit reference signal or is greater than the wide limit reference signal.

Accordingly, by setting the reference generator circuit to prescribed tolerances for an object under inspection, any inspected object having dimensions which do not fall within the prescribed tolerances will activate error circuitry for developing a reject signal. Also, if a test object is misaligned so that a portion of the object extends beyond the prescribed dimensional tolerances, a reject signal is developed. The automatic inspection system may also be used to detect various parameters of a flaw within a test object, such as the dimensions of the flaw, the alignment of the flaw, etc.

DESCRIPTION OF THE PREFERRED EMBODIMENT

Figure 1:
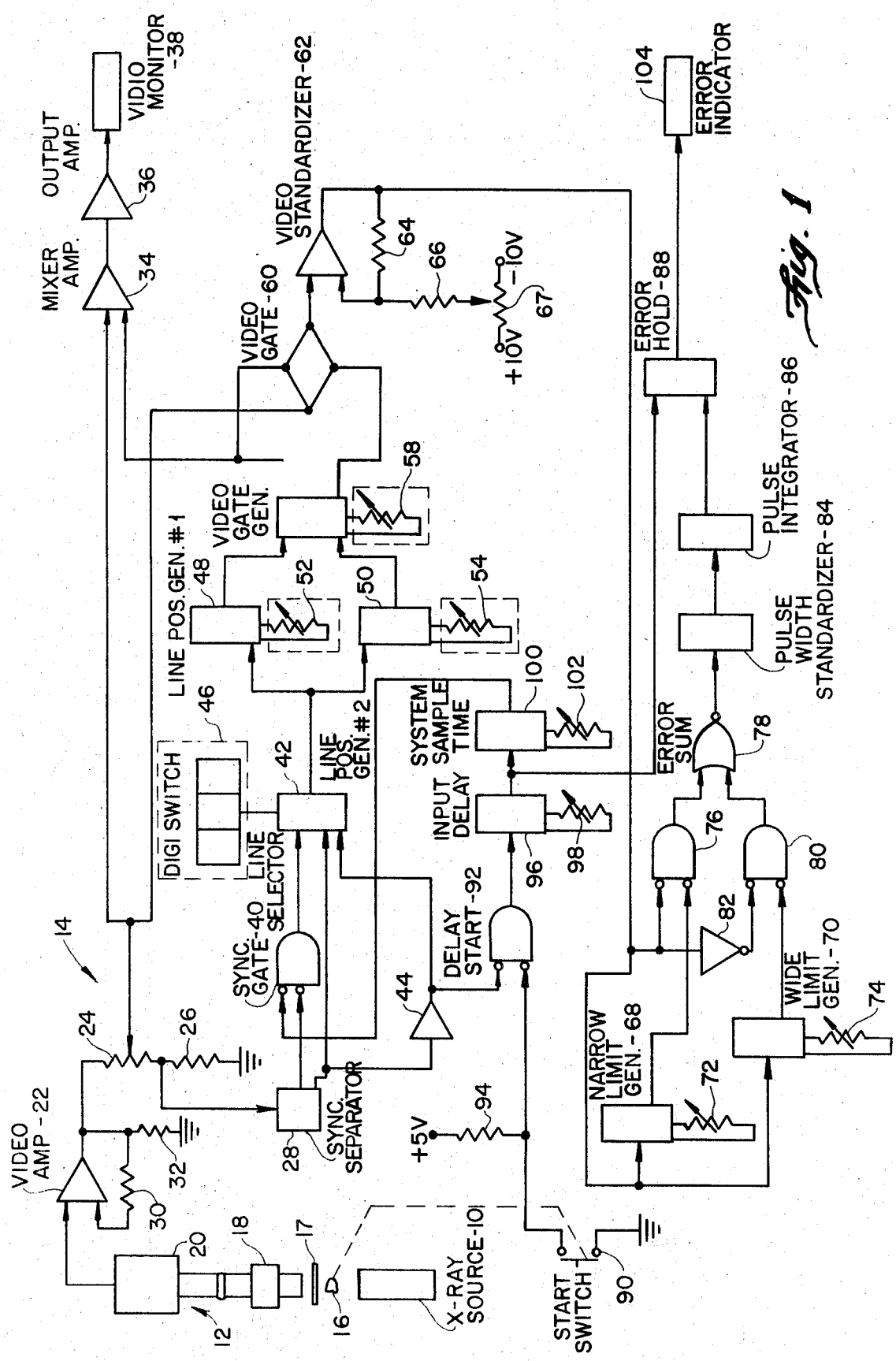
FIG. 1 is a block diagram, schematic view illustrating in basic form an X-ray inspection system incorporating automatic processor circuitry of the present invention.

FIG. 1 generally illustrates an automatic X-ray inspection system including an X-ray source 10, a video system 12 for viewing an irradiated object and for converting an image of the object into video signals, and an automatic video processor circuit 14 for processing the video signals and for developing an output error indication in the event the values of the video signals depart from preselected tolerances.

More particularly, an X-ray source 10 emits a beam of X-rays for irradiating an object 16 under inspection. An image of the irradiated object is presented on a fluorescent screen 17, and an image amplifier 18 is positioned to view the image. A television camera 20 is coupled to the image amplifier 18 for providing output video signals representative of the image which is present on the screen 17.

The video signals developed by the television camera 20 are applied to one of the input terminals of a video amplifier 22 having its output terminal connected to one of the stationary terminals of a display gain potentiometer 24. The other stationary terminal of the gain potentiometer 24 is connected through a resistor 26 to ground. This terminal is also connected to the input terminal of a synchronizing signal separator circuit 28. The output terminal of the video amplifier 22 is connected back through a resistor 30 to another input terminal of the amplifier. A resistor 32 is connected between the output terminal of the video amplifier 22 and ground.

The movable contact of the display gain potentiometer 24 is connected to the input terminal of a video mixer amplifier 34 having its output terminal connected through an output amplifier 36 to a video monitor 38. Thus, the video signals developed by the TV camera 20 are amplified and are applied through a display gain circuit comprising the potentiometer 24 and resistor 26, and are further amplified and applied to the video monitor 38.

The synchronizing signal separator circuit 28 serves to separate the horizontal and vertical synchronizing signals from the composite signals which are applied to the separator circuit. The horizontal synchronizing signals developed by the separator circuit 28 are applied to one of the input terminals of a synchronizing gate 40. The output terminal of the gate 40 is connected to one of the input terminals of a line counter circuit 42. Also, the vertical synchronizing signals developed by the synchronizing separator circuit 28 are applied to another one of the input terminals of the line counter circuit 42. In addition, the vertical synchronizing signals are applied through an inverter 44 to still another input terminal of the line counter circuit 42.

A preselected count is set into the line counter circuit 42 by an arrangement of three digi-switches 46 which are coupled to the line counter. The output signals developed by the line counter are applied to a pair of video line position generator circuits 48, 50. The position settings of the line position generator circuits 48, 50 may be adjustably set by a pair of line positioning potentiometers 52, 54.

The output signals developed by the line position generator circuits 48, 50 are then applied to the input terminals of a video gate generator circuit 56 having a potentiometer 58 for adjusting the length of the gating signal.

The output signals developed by the video gate generator circuit 56 are applied to the gating terminals of a video gate circuit 60. The output signals developed by the video gate generator circuit 56 are also applied to one of the input terminals of the mixer amplifier 34 for applying fiduciary marks to the composite video signals which are applied to the video monitor 38.

The composite video signals developed across the potentiometer 24 are applied to the input terminal of the video gate circuit 60 so that output video signals are developed by the video gate circuit 60 whenever gating signals are applied to the gate terminals of the video gate by the gate generator circuit 56.

The output video signals developed by the video gate circuit 60 are then applied to one of the input terminals of a video standardizer circuit 62. The output terminal of the standardizer is fed back through a resistor 64 to the other input terminal. This input terminal is connected through a resistor 66 to the movable contact of a potentiometer 67 having its stationary terminals connected to the positive and negative voltage potential. The video standardizer circuit 62 serves to compare the video signals to an adjustable DC level so that when the "white" portion of the video signal exceeds the preset DC level, the standardizer circuit produces an output signal of a fixed amplitude and having a time duration equal to the portion of the video signal which extends above the DC reference level.

The standardized video signals, or digitized signals developed by the video standardizer circuit 62, are then applied to the input terminals of a pair of the limit generator circuits 68, 70.

The narrow limit generator circuit 68, and its associated potentiometer 72, serve to generate a reference signal representative of the narrow reference limit, and the wide limit generator circuit 70, and its associated potentiometr 74, serve to develop a reference signal representative of a wide reference limit.

The output signal developed by the narrow limit generator circuit 68 is applied to one of the input terminals of a comparator circuit 76. The other input terminal of the comparator circuit 76 is connected directly to the output terminal of the video standardizer circuit 62, and the output terminal of the comparator circuit 76 is connected directly to an error summation circuit 78.

The output terminal of the wide limit generator circuit 70 is connected to one of the input terminals of another comparator circuit 80. The other input terminal of this comparator circuit is connected to the output terminal of an inverter 82 having its input terminal connected directly to the output terminal of the video standardizer circuit 62. As illustrated, the output terminal of the comparator circuit 80 is connected to the other input terminal of the error summation circuit 78, and the output terminal of the summation circuit 78 is connected directly to an error pulse width standardizer circuit 84. The output terminal of the error pulse width standardizer circuit 84 is connected through a pulse integrator circuit 86 to one of the input terminals of an error hold circuit 88.

When the test object 16 moves into position, a start switch 90 is closed thereby coupling one of the input terminals of a delay start gate 92 to ground. This input terminal is normally maintained at positive 5 volts through a resistor 94 which is connected between the input terminal and a 5 volt supply source. The other input terminal of the delay start gate 92 is connected to the output terminal of the inverter 44, and the output terminal of the start gate 92 is connected to an input delay circuit 96. The time delay for the input delay circuit 96 is controlled by a potentiometer 98, and the delayed output signal developed by the delay circuit 96 is applied to the input terminal of a sample timing circuit 100 and to the other input terminal of the error hold circuit 88. The sampling time of the timing circuit 100 is controlled by a potentiometer 102, and the output signal developed by this circuit is applied to another input terminal of the gating circuit 40.

The output terminal of the error hold circuit 88 is connected to an error indicator device 104 which may take the form of an alarm device or a mechanism for rejecting a defective test object.

In the operation of the automatic inspection system, the video signals developed by the TV camera 20 are amplified by the video amplifier 22 and are applied across the gain control potentiometer 24 and resistor 26. A portion of these video signals are tapped from the potentiometer 24 and are applied to the mixer amplifier 34 and to the video gate circuit 60. The mixer amplifier 34 serves to combine fiduciary marks with the composite video signal prior to applying these signals to the video monitor 38.

A portion of the composite video signal is applied to the synchronizing separator circuit 28. The synchronizing separator circuit 28 serves to strip the horizontal and vertical synchronizing signals from the composite video signal. The horizontal and vertical synchronizing signals are then applied to counting and logic circuits.

The vertical synchronizing signals are inverted by the inverter 44 and are applied to the delay-start gate 92. The start gate 92 allows the passage of vertical synchronizing signals only upon the closure of the start switch 90. As previously mentioned, the start switch 90 is closed when a test object is moved into position for inspection.

Upon closure of the start switch 90, vertical synchronizing pulses applied to the start gate 92 are gated into the delay circuit 96. In order to allow for mechanical settling of the part to be inspected, the delay circuit 96 is adjusted to delay the starting time of the system for between one to three fields of information. Upon completion of the delay timing, the sample timing circuit 100 is gated, and after a delay of between 4 and 10 fields of information, a gating signal is applied to the gate circuit 40, which in turn allows composite synchronizing information to be applied to the line counter circuit 42.

The line counter circuit 42 and digi-switch circuit 46 include three binary-coded-decimal counters which are decoded by three digi-switches and associated inverters. The digi-switches may be set on the front panel to thereby cause a trigger signal to be applied to the line position generator circuits 48, 50 at a preselected line number.

The line position generators 48, 50 serve to position the video gate generator along the horizontal line which is selected for processing. The output signal developed by either of the line position generators triggers the video gate generator circuit 56 and the output signal developed by this circuit is applied to the video mixer amplifier 34. The signal applied to the mixer amplifier 34 serves to superimpose fiduciary marks on the composite video signal thereby indicating the minimum and maximum limit values of an object under inspection.

The leading edge of the standardized video signal, or digitized signal developed by the standardizer circuit 62, gates the narrow and wide limit generators 68, 70. The output signals developed by the limit generators are then applied to the gates 76, 80 which serve to compare the digitized signals with minimum and maximum limit signals. An error signal produced by either of the gates 76, 80 is applied by the summation gate 78 to circuitry including the width standardizer 84, the pulse integrator 86, and the error hold circuit 88 for processing the error signal for presentation on the error detector 104.

Figure 2:
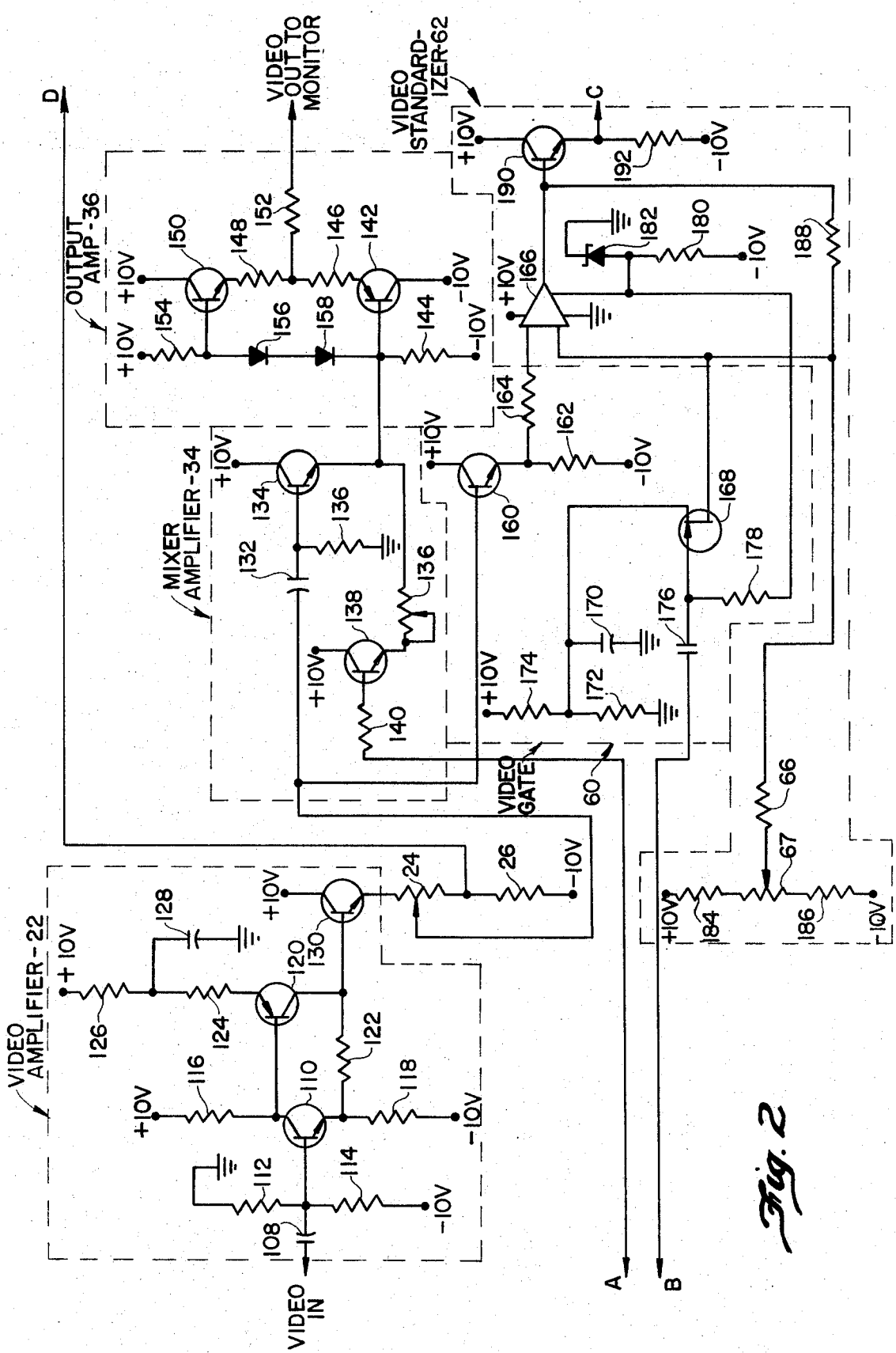
FIGS. 2 through 5 are block diagram, schematic views illustrating in more detail the automatic inspection system shown in FIG. 1.

Reference is now made to FIG. 2 which illustrates in more detail the specific circuitry of the video amplifier 22, the mixer amplifier 34, the output amplifier 36, the video gate circuit 60, and the video standardizer circuit 62. More particularly, the video signals from the television camera 20 are coupled through a capacitor 108 to the base of an NPN transistor 110. The base of the transistor 110 is conected through a resistor 112 to ground and through a resistor 114 to a negative 10 volt supply source.

The collector of the transistor 110 is connected through a resistor 116 to a positive 10 volt supply source and the emitter of this transistor is connected through a resistor 118 to the negative 10 volt supply source. As illustrated, the collector of the transistor 110 is also connected to the base of a PNP transistor 120 having its collector connected back through a resistor 122 to the emitter of the transistor 110.

The emitter of the transistor 120 is connected through a pair of series-connected resistors 124, 126 to the positive 10 volt supply source, and the juncture point between these resistors is coupled through a capacitor 128 to ground. In addition, the collector of the transistor 120 is connected to the base of an NPN transistor 130 having its collector connected directly to the positive 10 volt supply source and its emitter connected to one of the stationary terminals of the display gain potentiometer 24. The other stationary contact of the potentiometer 24 is connected through the resistor 26 to the negative 10 volt supply source. The juncture point between the potentiometer 24 and the resistor 26 provides an output terminal D which is connected to the synchronizing separator circuit 28.

The movable contact of the potentiometer 24 is coupled through a capacitor 132 to the base of an NPN transistor 134 in the mixer amplifier circuit 34. The base of the transistor 134 is also connected through a resistor 136 to ground and the collector of this transistor is connected directly to the positive 10 volt supply source. In addition, the emitter of the transistor 134 is connected through potentiometer 136 to the emitter of another NPN transistor 138. The collector of this transistor is connected to the positive 10 volt supply source and the base of this transistor is connected through a resistor 140 to an output terminal "A" which is connected to the video gate generator circuit 56.

The emitter of the transistor 134 in the mixer amplifier 34 is also connected to the base of a PNP transistor 142 in the output amplifier 36. The base of this transistor is also connected through a resistor 144 to the negative 10 volt supply source and the collector of this transistor is connected directly to the negative 10 volt supply source. In addition, the emitter of the transistor 142 is connected through a pair of series-connected resistors 146, 148 to the emitter of an NPN transistor 150. The juncture point between the series-connected resistors 146, 148 is coupled through a resistor 152 to the video monitor 38.

The collector of the transistor 150 is connected directly to the positive 10 volt supply source and the base of this transistor is connected through a resistor 154 to the positive 10 volt supply source. A pair of series-connected diodes 156, 158 polarized as illustrated in FIG. 2, are connected between the bases of the transistors 142, 150.

The movable contact of the display gain potentiometer 24 is additionally connected to the base of an NPN transistor 160 in the video gate circuit 60. The collector of the transistor 160 is connected directly to the positive 10 volt supply source and the emitter of this transistor is connected through a resistor 162 to the negative 10 volt supply source. As illustrated, the emitter of the transistor 160 is also connected through a resistor 164 to one of the input terminals of a comparator circuit 166 in the video standardizer circuit 62. The other input terminal of the comparator circuit 166 is connected to the source terminal of a field effect transistor 168 in the video gate circuit 60. The drain terminal of the field effect transistor 168 is coupled through a capacitor to ground and is connected to the juncture point between a pair of series-connected resistors 172, 174. The other terminal of the resistor 172 is connected directly to ground and the other terminal of the resistor 174 is connected to the positive 10 volt supply source.

The gate terminal of the field effect transistor 168 is coupled through a capacitor 176 to an output terminal "B" which is connected to the video gate generator circuit 56. The gate terminal of the transistor 168 is also connected through a resistor 178 to the juncture point between a resistor 180 and a Zener diode 182, polarized as shown in FIG. 2. The other terminal of the diode 182 is connected directly to ground and the other terminal of the resistor 180 is connected to the negative 10 volt supply source. The juncture point between the resistor 180 and the Zener diode 182 is also connected to the comparator circuit 166 for supplying a constant potential voltage signal to the comparator.

The source terminal of the field effect transistor 168 in the video gate circuit 60 is connected through the resistor 66 to the movable contact of the potentiometer 67 which serves to set the reference voltage for the comparator circuit 166 in the video standardizer circuit 62. One of the stationary contacts of the potentiometer 67 is connected through a resistor 184 to the positive 10 volt supply source and the other stationary contact of the potentiometer is connected through a resistor 186 to the negative 10 volt supply source.

The source terminal of the field effect transistor 168 in the video gate circuit 60 is also connected through a resistor 188 to the output terminal of the comparator circuit 166, which is in turn connected to the base of an NPN transistor 190. The collector of the transistor 190 is connected directly to the positive 10 volt supply source and the emitter of this transistor is connected through a resistor 192 to the negative 10 volt supply source. The emitter of the transistor 190 also provides an output terminal "C" which is connected to the narrow and wide limit generator circuits 68, 70.

In the operation of the video amplifier 22, the transistors 110, 120 serve as voltage feedback devices with the gain of these devices controlled by the value of the resistor 118 to that of the resistor 122. The transistor 130 is connected in an emitter follower configuration in order to provide a low impedance driving signal for the display gain potentiometer 24.

A portion of the composite video signal which is present at the output terminal of the video amplifier 22 is applied to the mixer amplifier 34 and the video gate circuit 60. The transistors 134 and 138 serve the function of differential mixers. Accordingly, "white" positive gating signals are applied to the base of the transistor 138 from the video gate generator circuit 56 as will be subsequently described. The potentiometer 136 serves to control the amplitude of the marker signal which is applied to the video monitor by limiting the amount of differential emitter current drawn by the transistor 138.

The composite video signal with the added fiduciary markers is then directly coupled from the emitter of the transistor 134 to the base of the transistor 142 and through the diodes 156, 158 to the base of the transistor 150. The transistors 142, 150 are connnected in a complementary emitter follower configuration to supply a low output impedance to drive a coaxial cable which is connected to the video monitor 38.

The composite video signals developed at the movable contact of the display gain potentiometer are also applied through the emitter-follower transistor 160 to the comparator circuit 166. The comparator circuit 166 operates to rapidly switch the level of the output signal whenever the differential input voltage exceeds zero volts. The non-inverting input terminal of this amplifier is connected to a variable potential source through the potentiometer 67 and the resistors 184, 186. Thus, the amplitude at which the change in the output voltage developed by the comparator 166 may be varied. The potentiometer 67 is adjusted so that an output signal will be developed by the comparator circuit 166 only when the input signal-to-noise ratio is of a level to prevent noise signals from being processed by the remainder of the processor circuitry.

Figure 3:
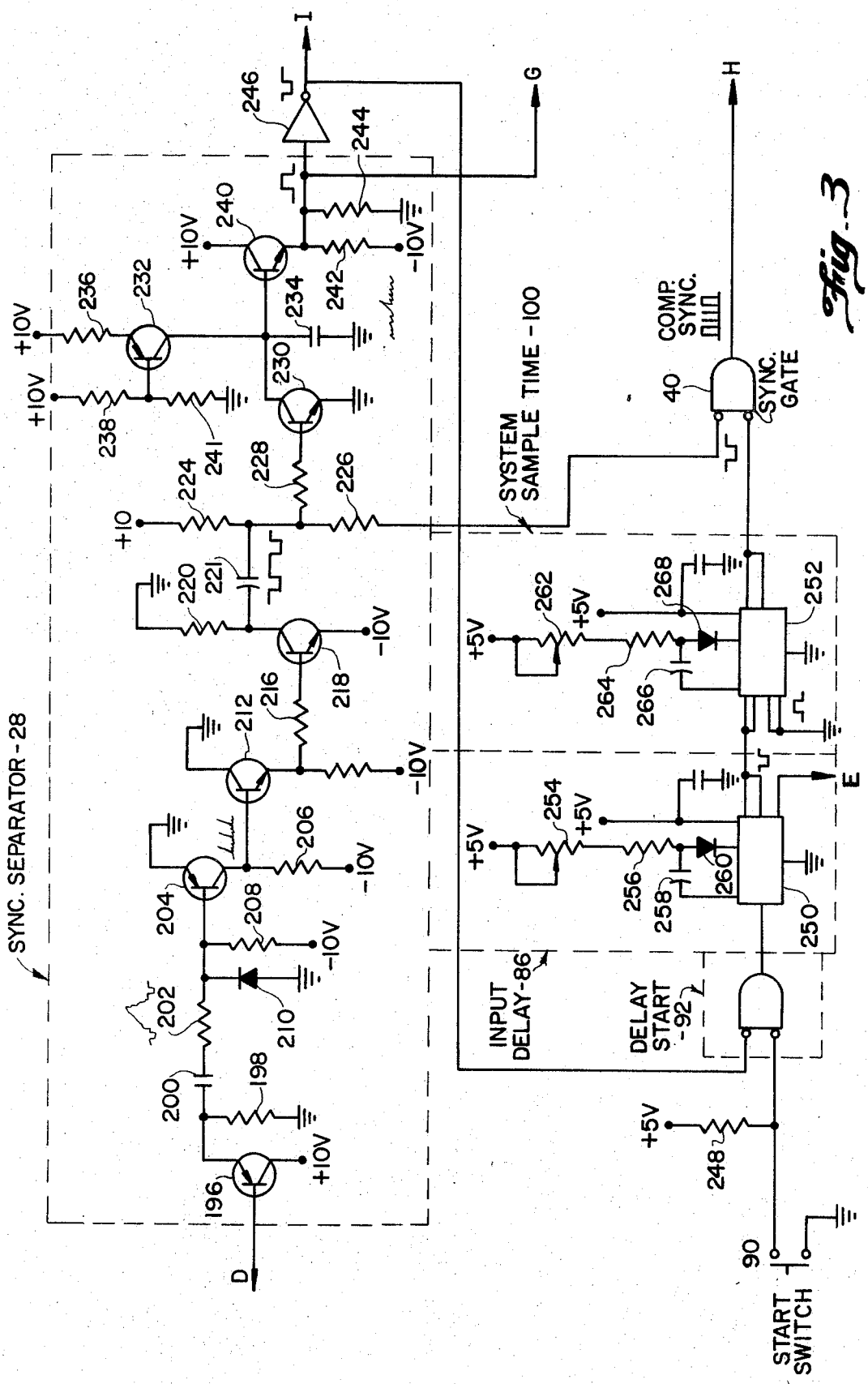

FIG. 3 illustrates the detailed circuitry within the synchronizing separator circuit 28, the delay start circuit 92, the input delay circuit 96 and the sample timing circuit 100. More particularly, the synchronizing separator circuit 28 includes a PNP transistor 196 which is connected in an emitter follower configuration with the collector terminal connected directly to the positive 10 volt supply source and the emitter connected through a resistor 198 to ground. The base of the transistor 196 is connected to the output terminal "D" which is in turn connected to the movable contact of the display gain potentiometer 24.

The emitter of the transistor 196 is also coupled through a capacitor 200 to one of the terminals of a resistor 202. The other terminal of the resistor 202 is connected to the base of a PNP transistor 204 having its collector connected through a resistor 206 to the negative 10 volt supply source and its emitter connected directly to ground. The base of the transistor 204 is connected through a resistor 208 to the negative 10 volt supply source and to the cathode of a diode 210. The anode of the diode 210 is connected directly to ground.

As illustrated, the collector of the transistor 204 is connected directly to the base of an NPN transistor 212 having its collector connected directly to ground and its emitter connected through a resistor 214 to the negative 10 volt supply source. The emitter of the transistor 212 is also connected through a resistor 216 to the base of another NPN transistor 218.

The emitter of the transistor 218 is connected directly to the negative 10 volt supply source and the collector of this transistor is connected through a resistor 220 to ground. The collector of the transistor 218 is also coupled through a capacitor 222 to the juncture point between a pair of series-connected resistors 224 and 226. The other terminal of the resistor 224 is connected to the positive 10 volt supply source, and the other terminal of the resistor 226 is connected to one input terminal of the synchronizing gate 40.

The juncture point between the series-connected resistors 224, 226 is coupled through a resistor 228 to the base of an NPN transistor 230 having its emitter connected directly to ground and its collector connected to the collector of a PNP transistor 232. The collector of the transistor 232 is coupled through a capacitor 234 to ground and the emitter of this transistor is connected through a resistor 236 to the positive 10 volt supply source. In addition, the base of the transistor 232 is connected to the juncture point between a pair of series-connected resistors 238, 241. The other terminal of the resistor 238 is connected to the positive 10 volt supply source, and the other terminal of the resistor 241 is connected directly to ground.

The collector of the transistor 230 is also connected to the base of an NPN transistor 240 having its collector connected directly to the positive 10 volt supply source and its emitter connected through a resistor 242 to the negative 10 volt supply source. The emitter of the transistor 240 is also connected through a resistor 244 to ground and to the input terminal of an inverter 246. The emitter of the transistor 240 additionally provides an output terminal "G" which is connected to the line counter circuit 42.

The output terminal of the inverter 246 provides an output terminal "I" which is connected to one of the input terminals of the line counter circuit 42. The output terminal of the inverter 246 is also directly connected to one of the input terminals of the delay start gate 92. The other terminal of the delay start gate is connected through a resistor 248 to the positive 5 volt supply source. This input terminal of the start gate 92 is also connected to one of the terminals of the normally open start switch 90. The other terminal of the switch 90 is connected directly to ground.

The output terminal of the delay start gate 92 is connected to the input delay circuit 96 which takes the form of a one-shot multivibrator. More particularly, the delay circuit includes a multivibrator 250 having an input terminal connected to the delay start gate 92 and an output terminal connected to the input terminal of another one-shot multivibrator 252 in the sample timing circuit 100. The multivibrator 252 is biased through a variable potential arrangement including a potentiometer 254, resistor 256, capacitor 258, and diode 260 so that the delay timing of the multivibrator may be varied. The other output terminal of the multivibrator 250 provides an output terminal "E" which is connected to a reset terminal in the pulse integrator and error hold circuit.

The multivibrator 252 is similarly biased through a potentiometer 262, resistor 264, capacitor 266, and diode 268 so that the delay timing of this multivibrator may also be varied. The output terminal of the multivibrator 252 is then fed into one of the input terminals of the synchronizing gate 40. The output terminal of the gate 40 provides an output terminal "H" which is connected to the line counter circuit 42.

When an object to be inspected is moved into the inspection position, the start switch 90 is closed to thereby ground the lower input terminal of the delay start gate 92. The output signal developed by the start gate 92 remains at a logical "0" state because the signal applied to the upper input terminal is at a logical "1" state until the first negative vertical synch pulse is received from the inverter 246. Upon receipt of a vertical synch pulse from the inverter, both inputs to the start gate 92 are at logical "0" states thereby allowing the output signal developed by the gate to change to a logical "1" state.

When the output signal developed by the start gate 92 changes to logical "1" state, the multivibrator 250 begins a timing cycle. The timing cycle of the multivibrator 250 may be adjusted from 1 to 3 video fields and serves to delay the start of the test in order to allow for mechanical settling of the part to be inspected.

At the completion of the timing cycle of the multivibrator 250, a signal is applied to the multivibrator 250 to initiate another timing cycle. The timing cycle of the multivibrator 250 is adjusted from 2 to 10 video fields which is the actual time during which the comparison measurements of the object under inspection are performed.

At the time of initiating the timing cycle of the multivibrator 252, the logical "0" signal is applied to the lower input terminal of the synchronizing gate 40. The upper input gate of the synchronizing gate 40 is maintained at a logical "1" state by the biasing resistor 224 except during the time of receipt of negative polarity synch signals. Thus, the signals developed by the gate take the form of inverted synch pulses which appear after the closure of the start switch 90.

In the operation of the synchronizing separator circuit 28, composite video signals which are developed across the resistor 26 are applied to the base of the emitter follower transistor 196. This transistor provides a low impedance output for the following stages of synch separation.

The output signals developed by the transistor 196 are coupled through the capacitor 200 and are applied across the resistor 208 to the clamping diode 210 and the base of the transistor 204. The negative polarity portion of the composite video signal causes the clamping diode 210 to conduct and to produce a signal of approximately 0.6 volts at the base of the transistor 204. The transistor 204 is biased in a manner so that it will only conduct during negative cycles and effectively separate the synchronizing waveform from the video signals.

The transistor 212 provides an impedance transformation from the high impedance output of the transistor 204 in the separation stage to a low impedance input to the common emitter amplifier including the transistor 218. The circuit including the transistor 218 provides further clipping of the synch signal to thereby remove any remaining video information.

The synch signal developed by the circuit including the transistor 218 is then coupled through the resistor 226 to the synchronizing gate 40. The synch signal is also coupled through the resistor 228 to a vertical synch separator circuit including the transistor 230. The transistor 230 is connected across an integrating capacitor 234 and is biased in a manner such that the transistor is saturated. A constant current circuit including the transistor 232 charges integrating capacitor 234 only during an interval of time at which the transistor 230 is turned off by the negative going synch pulses developed by the transistor 218.

The circuit including the transistor 240 is responsive to the charge across the integrating capacitor 234 and provides a low impedance source of vertical synch signals to drive the subsequent logic and counting circuits.

Figure 4:
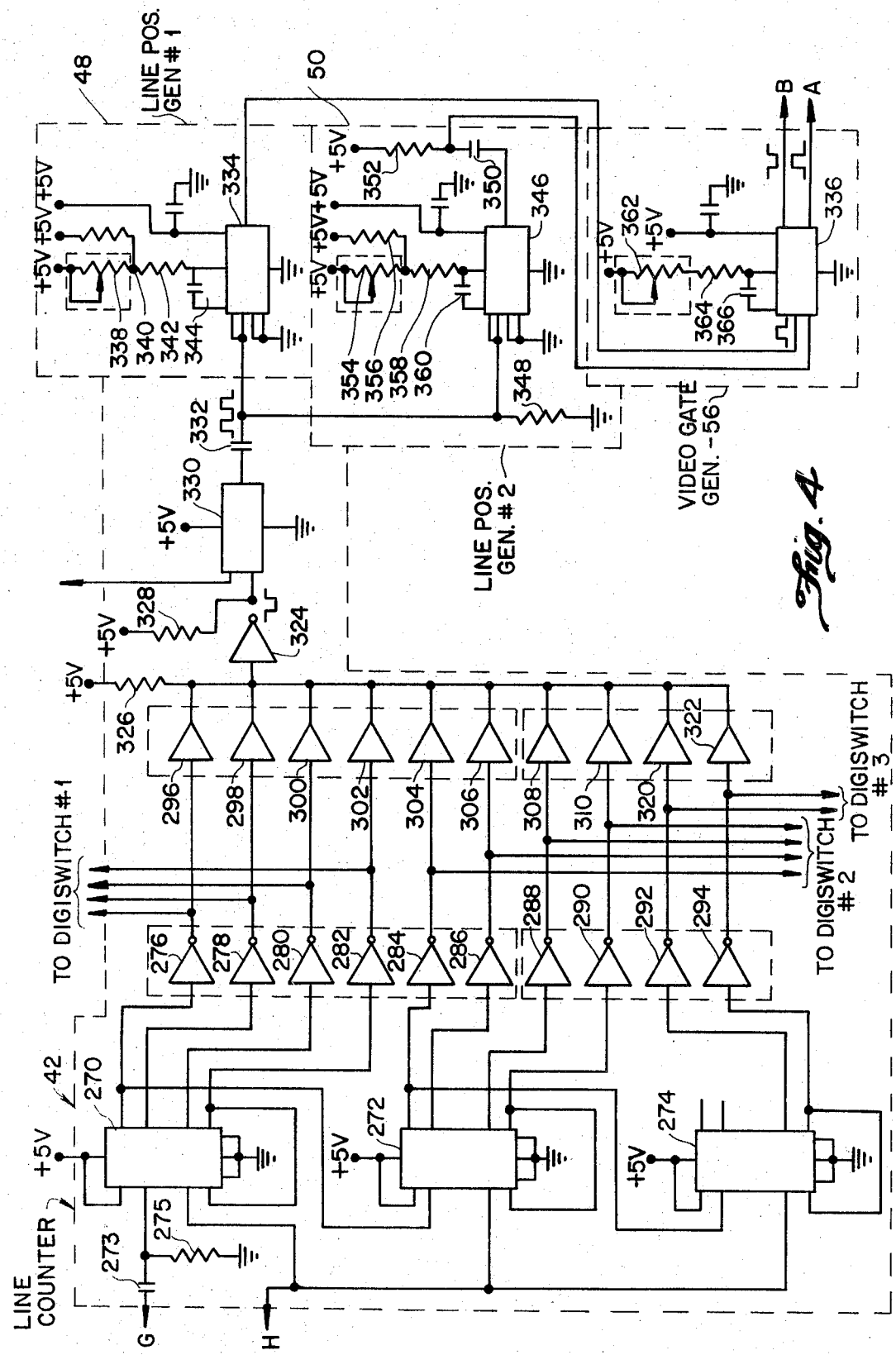

Reference is now made to FIG. 4 which illustrates in more detail the circuitry in the line counter circuit 42, the line position generator circuits 48, 50, and the video gate generator circuit 56.

More particularly, the counter circuit 42 includes three binary-coded-decimal counters 270, 272, 274. The first input terminal of the counter 270 is connected directly to the positive 5 volt supply source, and the second input terminal of this counter is coupled through a capacitor 273 to the output terminal "G" of the synchronizing separator circuit 28. The second input terminal of the counter 270 is also connected through a resistor 275 to ground. The third input terminal of the counter 270 is connected in common with the third input terminals of the counters 272, 274 to the output terminal "H" of the synchronizing gate 40.

The four output terminals of the binary-coded-decimal counter 270 are each respectively connected to one of the input terminals of four inverters 276, 278, 280, 282. The first output terminal of the counter 270 is additionally connected to the second input terminal of the counter 272, and the fourth output terminal of the counter 270 is fed back and connected to its fourth input terminal.

The four output terminals of the binary-coded-decimal counter 272 are each respectively connected to one of the input terminals of four inverters 284, 286, 288, 290. The first output terminal of the counter 272 is additionally connected to the second input terminal of the counter 274 and the fourth output terminal of the counter 272 is fed back and connected to its fourth input terminal. The first input terminal of the counter 272 is connected directly to the positive 5 volt supply source.

The third and fourth output terminals of the binary-coded-decimal counter 274 are each respectively connected to one of the input terminals of a pair of inverters 292, 294. The fourth output terminal of the counter 274 is fed back and connected to the fourth input terminal of this counter. Also, the first input terminal of the counter 274 is connected directly to the positive 5 volt supply source.

The ouput terminals of each of the ten inverters 276 through 294 are each connected to one of the input terminals of ten inverters 296, 298, 300, 302, 304, 306, 308, 310, 320, 322. The output terminals of the ten inverters 296 through 322 are connected in common to the input terminal of a single inverter 324. These commonly connected output terminals are also connected through a resistor 326 to the positive 5 volt supply source.

The four output terminals of the inverters 276, 278, 280, 282 are connected to the four terminals of a first digi-switch. The four output terminals of the inverters 284, 286, 288, 290 are connected to the four terminals of a second digi-switch and the output terminals of the inverters 292, 294 are connected to two of the terminals of a third digi-switch.

As illustrated, the output terminal of the inverter 324 is coupled through a resistor 328 to the positive 5 volt supply source. This output terminal is also connected to one of the input terminals of a multivibrator 330. The other input terminal of the multivibrator 330 is connected to the output terminal "I" of the inverter 246 (FIG. 3).

The output terminal of the multivibrator 330 is coupled through a capacitor 332 to one of the input terminals of a multivibrator 334 in the line position generator circuit 48. The other input terminal of this multivibrator is connected to ground and the output terminal is connected to one of the input terminals of still another multivibrator 336 in the video gate generator circuit 56. The delay time for the multivibrator 334 may be adjustably set through an arrangement of a potentiometer 338, a resistor 340, and resistor 342, and a capacitor 344 as illustrated in FIG. 4.

The output terminal of the multivibrator 330 in the line counter circuit 42 is also coupled through the capacitor 332 to one of the input terminals of a multivibrator 346 in the line position generator circuit 50. This input terminal is also connected through a resistor 348 to ground. The other input terminal of the multivibrator 346 is connected directly to ground and the output terminal of this device is coupled through a capacitor 350 to the other input terminal of the multivibrator 336 in the video gate generator circuit 56. This latter input terminal is connected through a resistor 352 to the positive 5 volt supply source. The delay timing of the multivibrator 346 is adjustable through an arrangement of a potentiometer 354, a resistor 356, a resistor 358, and a capacitor 360 as illustrated in FIG. 4.

Similarly, the delay time for the multivibrator 336 in the video gate generator circuit 56 may be adjusted through an arrangement of a potentiometer 362, a resistor 364, and a capacitor 366 as illustrated in FIG. 4. One of the output terminals of the multivibrator 336 is connected through the resistor 140 to the transistor 138 in the mixer amplifier circuit 34, and the other output terminal is connected through the capacitor 176 to the gate of the field effect transistor 168 in the video gate circuit 60.

the composite synchronizing signals are coupled through the capacitor 273 to the input of the binary-coded-decimal counter 270. Each horizontal synch pulse advances the counter 270 by one count. Accordingly, output signals are generated by this counter for count numbers 1, 2, 4 and 8. Upon receipt of the tenth count, the counter 270 is reset to a logical "0" state thereby providing an output pulse to the second counter 272.

The counter 272 operates in a manner similar to counter 270 and provides an output to the counter 274 after the receipt of the tenth input pulse. A vertical reset pulse is utilized to reset the counters to a logical "0" at the start and finish of each video field.

The binary output signals developed by the counters 270, 272, 274 are applied through the buffer-inverters 276 through 294 to the contacts of the digi-switches and to the input terminals of the inverters 296 through 322. With the commonly connected outputs of the inverters 296 through 392, if any input to the inverters 296 through 322 is at a logical "1" state, the signal developed at the common output terminals will be at a logical "0" state. The digi-switches serve to short out all of the inverter input terminals to ground except the particular number selected. The output signals developed by the inverters 276 through 294 will, when unshorted by the digi-switches, remain at a logical "1" state until the number which is selected has been counted. At the time the selected number is counted, the output signal will drop to zero. At the time when all of the inputs to the inverters 296 through 322 are at logical "0" states, a logical "1" signal will be produced at the common outputs of the inverters 296 through 322. Accordingly, if the number 5, for example, is selected, the outputs of inverters 276 and 282 will be at a logical "0" state. This logical state will produce a logical "1" state at the common output line of the inverters 296 through 322.

The output signals developed by the inverters 296 through 322 are coupled through the inverter 324 to the multivibrator 330 causing it to reset and remain in the reset state until the next vertical field pulse resets this device. Thus, there will be only one output pulse at the particular television scan line selected by the digi-switch.

When the pulse signal developed by the multivibrator 330 is applied to the multivibrators 334, 336, a timing cycle is started which is less than the duration of a single television scan line in length and is controlled by the potentiometers 338, 354 to produce video gates which are applied to the video standardizer circuit 62.

Figure 5:
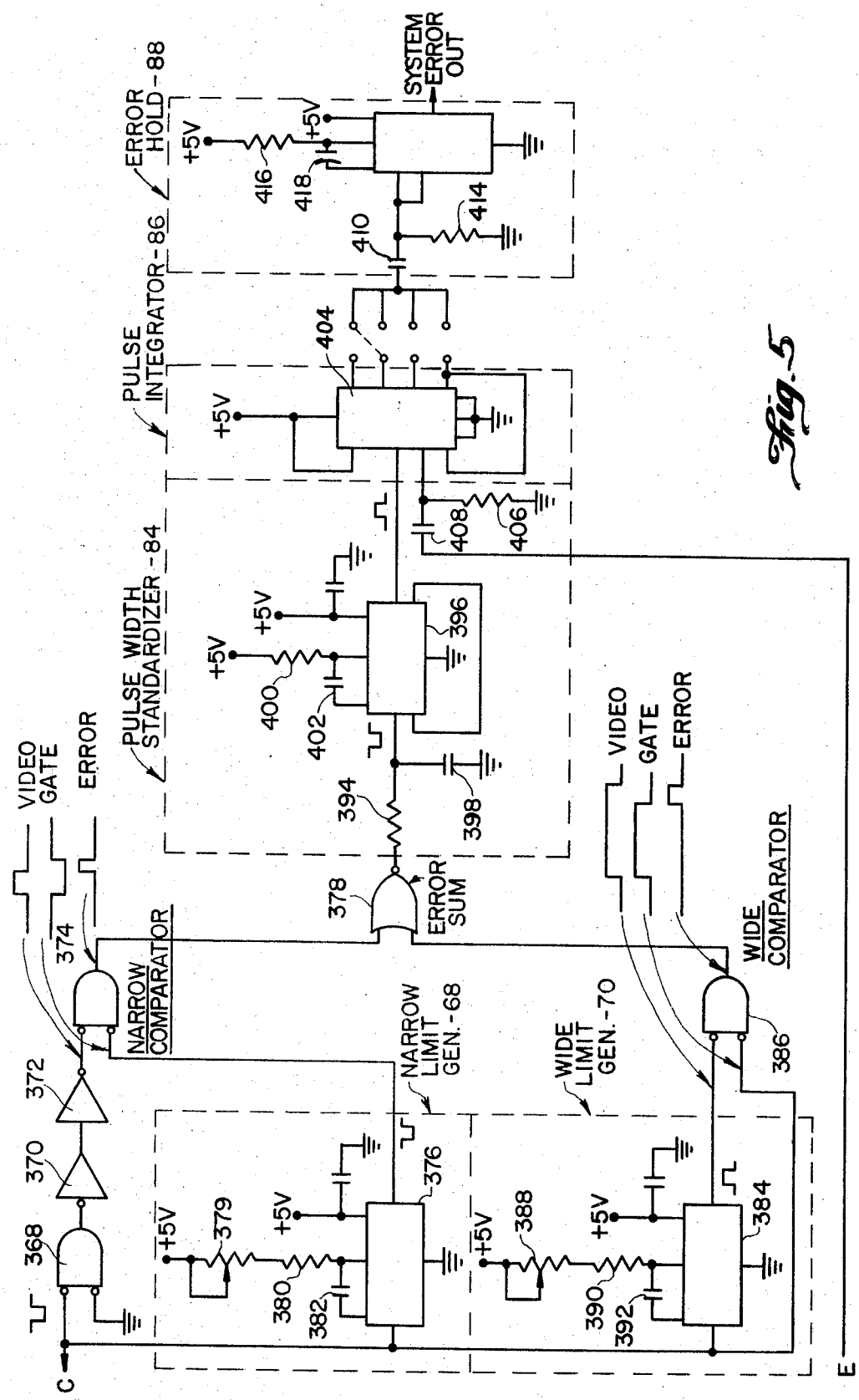

Reference is now made to FIG. 5 which illustrates in more detail the circuitry within the narrow limit generator circuit 68, the wide limit generator circuit 70, the pulse width standardizer circuit 84, the pulse integrator circuit 86, and the error hold circuit 88.

More particularly, the ouput terminal "C" from the video standardizer circuit 62 is connected to one of the input terminals of a gate 368. The other input terminal of the gate 368 is connected to ground and the output terminal of this gate is connected through an amplifier 370 and an inverter 372 to one of the input terminals of another gate 374. The other input terminal of the gate 374 is connected to the output terminal of a multivibrator 376 is the narrow limit generator circuit 68. The output terminal of the gate 374 is connected to one of the input terminals of an error summation gate 378.

The input terminal of the multivibrator 376 and the narrow limit generator circuit 68 is connected to the output terminal "C" from the video standardizer circuit 62. As illustrated in FIG. 5, the width of the signal developed by the narrow limit generator circuit 68 may be varied by an arrangement of a potentiometer 379, a resistor 380, and a capacitor 382.

The wide limit generator circuit 70 includes a multivibrator 384 having its input terminal connected to the output terminal "C" of the video standardizer circuit 62. The output terminal of the multivibrator 384 is connected to one of the input terminals of a gate 386 having its other input terminal connected to the output terminal "C" of video standardizer circuit 62. The output terminal of the gate 386 is connected to the other input terminal of the error summation gate 378. As is the case with the multivibrator 384 in the wide limit generator circuit 70 may be varied through an arrangement of a potentiometer 388, a resistor 390, and a capacitor 392 as illustrated in FIG. 5.

The output terminal of the error summation gate 378 is connected through a resistor 394 to the input terminal of a multivibrator 396 in the pulse width stabilizer circuit 84. The input terminal of this multivibrator is coupled through a capacitor 398 to ground, and one of the output terminals of this multivibrator is fed back to the other input terminal of the device. The multivibrator 396 is biased through an arrangement of a resistor 400 and a capacitor 402 as shown in FIG. 5. The other output terminal of the multivibrator 396 is connected to one of the input terminals of a ring counter 404 in the pulse integrator circuit 86. The reset terminal of the counter 404 is connected through a resistor 406 to ground. This reset terminal is also coupled through a capacitor 408 to the output terminal "E" of the input delay circuit 96.

In addition, the output terminal of the counter 404 is coupled through a capacitor 410 to the input terminal of a multivibrator 412 in the error hold circuit 88. This input terminal is also connected through a resistor 414 to ground. The multivibrator 412 is biased through an arrangement of a resistor 416 and capacitor 418 as illustrated in FIG. 5. The output terminal of the multivibrator 412 provides the system error output signal which is applied to an output indicator device, such as an alarm device or a mechanism for rejecting an object under inspection.

In the operation of the limit generators 68, 70, the leading edge of a video pulse from the comparator 166 causes the multivibrators 376, 384 to begin their respective timing cycles. The timing cycles of these multivibrators are adjusted by the resistors 378, 388 so that the pulse widths developed by the limit generators represent the minimum and maximum allowable tolerances of the object to be inspected.

The positive wide limit pulse from the wide limit generator 70 is compared with negative video pulses from the video comparator circuit 166. If the video and comparison pulses are the same width, there will be no output signal developed by the wide limit gate 386 since one of the inputs to the gate will always be at a logical "1" level while the other terminal is at a logical "0" level, and vice versa.

If the video pulse is wider than the reference signal pulse, both inputs will be at logical "0" levels from the time of the termination of the reference pulse until the combination of the video pulses. During this period of time, the gate will develop an output signal indicating that the object has a dimension which is greater than a maximum tolerance. If the video pulse is narrower than the reference pulse, no output signal will be produced by the gate 386 for the reason that one or both of the input terminals will be at a logical "1" level. Thus, an error pulse will be developed by the gate 386 only when the width of the video pulse exceeds the width of the reference pulse developed by the multivibrator 384.

The narrow limit comparator circuit operates in a somewhat similar manner, however, the reference and video pulses are processed with inverted polarity with respect to processing in the wide limits comparator. Thus, an output error signal will be produced only when the video pulse is of a narrower width than that of the reference pulse.

The ouputs from the gates 374, 386 are summed in a NOR gate 398 so that an error from either of the comparator circuits will produce an output signal. The monostable multivibrator 396 serves the function of dividing the number of error pulses by two during a single television field of measurement so that only one output signal will be developed even if both a wide and narrow limit error occur during a single field of measurement.

The timing cycle of the multivibrator 396 is set to be longer than the time between the first and second error pulses, therefore, the multivibrator 396 will fail to respond to the second error pulse. If the error pulse occurs during the second sampling period, it will trigger the multivibrator 396 and an error will be produced thereby providing at least one error output per sample.

The pulse integrator circuits 86 serves to reduce the effect which various system noises, such as quantum noise, would have on the output indication. The ring counter 404 is connected to provide a binary output. Thus, each error signal developed by the multivibrator 396 will cause the counter 404 to advance by one count. The maximum count for the counter 404 is nine with the unit resetting to zero on the tenth pulse. Thus, if, for example, ten fields of video information are used during a measurement period, the integrator circuit may be set to produce a reject output signal only after the occurrence of four error signals.

The multivibrator A5 serves to store and present the output error signal for so long as the object under inspection remains in the inspect position. Once the part has been removed from the inspection position, the error hold circuit 88 is reset to start a new measurement cycle.

Although one embodiment of the invention has been described and illustrated, it is apparent to one skilled in the art that various changes and modifications may be made without departing from the spirit and scope of the invention.

Having thus described my invention, I claim:

1. In an X-ray inspection apparatus including a source of X-ray for irradiating an object under inspection; and video means positioned to view an image resulting from the irradiation of said object for developing video signals having values representative of the viewed image, and horizontal and vertical scan synchronizing pulses, the improvement comprising an automatic video processor circuit including;

adjustable line counter means for developing a first control signal upon the receipt of a preselected number of horizontal synchronizing pulses;

adjustable line position generator means for developing a second control signal upon the occurrence of a first control signal and at a predetermined period of time after the receipt of a vertical synchronizing pulse;

video gating means having an output circuit and being coupled to said video means for, upon receipt of a second control signal, applying video signals to its output circuit;

standardizer circuit means coupled to said output circuit of said video gating means for converting video signals to digitized signals having values representative of the values of the video signals;

adjustable reference generator means for developing a signal representative of a preselected limit; and, comparator circuit means for comparing said digitized signals with said limit reference signal and for developing an error signal if the value of said digitized signals attain a predetermined level with respect to the value of said limit reference signal.

2. An apparatus as defined in claim 1 wherein said adjustable reference generator means includes signal limit generator means for developing a reference signal having a preselected width, and said comparator circuit means including circuit means for developing an error signal if the width of one of said digitized signals exceeds the width of the reference signal developed by said signal limit generator.

3. An apparatus as defined in claim 1 wherein said adjustable reference generator means includes signal limit generator means for developing a signal having a preselected width, and said comparator circuit means includes circuit means for developing an error signal if the width of one of said digitized signals is less than the width of the signal developed by said signal limit generator.

4. An apparatus as defined in claim 1 wherein said adjustable reference generator means includes first signal limit generator means for developing a first output signal having a preselected width, second signal limit generator means for developing a second output signal having a preselected width which is greater than the width of said first signal, and said comparator circuit means including circuit means for developing an error signal if the width of one of said digitized signals exceeds the width of said second output signal or is less than the width of said first output signal.

5. An apparatus as defined in claim 1 wherein said adjustable reference generator means includes first signal limit generator means for developing a first output signal having a preselected width, second signal limit generator means for developing a second output signal having a preselected width which is greater than the width of said first signal, and said comparator circuit means including first comparator means coupled to said first limit generator means and to said standardizer circuit means for developing an output signal if the width of one of said digitized signals exceeds the value of said second signal, second comparator means coupled to said second limit generator means and to said standardizer circuit means for developing an output signal if the value of one of said digitized signals is less than the value of said first signal, and summation circuit means coupled to said first and second comparator means for developing an error signal if an output signal is developed by either said first or second comparator means.

6. In an object inspection apparatus for automatically measuring a dimension of an object and including a source of electromagnetic radiation for irradiating the object,; means for producing video signals in response to the irradiation of said object, said video signals having values representative of said dimension of said object, and further including horizontal scan synchronizing pulses, the improvement comprising an automatic video processor circuit including:

a video gate having an input circuit and an output circuit for, in response to a first control signal, applying video signals received by its input circuit to its output circuit;

a control circuit coupled between said video signal producing means and said video gate and responsive to the occurrence of a predetermined number of horizontal scan synchronizing pulses received by said control circuit for applying said first control signal to said video gate for an interval limited to a time between two successive horizontal scan synchronizing pulses;

an adjustable reference generator for developing a reference signal independently of an actual dimension of an object, said reference signal representative of a value of said dimension to be automatically measured; and, a comparator circuit coupled to said output circuit of said video gate for comparing said video signals applied to the output of the video gate and representing said dimension of said object with said reference signal and for developing an error signal when the difference between the value of said dimension represented by said video signal applied to the output of the video gate and the value of said reference signal exceeds a predetermined difference.

7. An apparatus as defined in claim 6 further comprising a standardizer circuit for digitizing said video signals, and wherein said adjustable reference generator includes a signal limit generator for developing a reference signal having a value representing a preselected magnitude of said dimension, and said comparator circuit means includes circuit means for developing an error signal if the width represented by said digitized video signals exceeds the width represented by the reference signal developed by said signal limit generator.

8. An apparatus as defined in claim 6 further comprising a standardizer circuit connected to the comparator circuit for digitizing said applied video signals, and wherein said adjustable reference generator includes a signal limit generator for developing a signal having a value representing a preselected magnitude of said dimension and said comparator circuit includes circuit means for developing an error signal if the magnitude represented by said digitized signals is less than the magnitude represented by the signal developed by said signal limit generator.

9. An apparatus as defined in claim 6 further comprising a standardizer circuit connected to the comparator circuit for digitizing said applied video signals, and wherein said adjustable reference generator includes a first signal limit generator for developing a first output signal having a value representing a preselected magnitude of said dimension, a second signal limit generator for developing a second output signal having value representing a preselected magnitude of said dimension which is greater than the magnitude represented by said first output signal, and said comparator circuit includes circuit means for developing an error signal if the magnitude represented by said digitized applied signals exceeds the magnitude represented by said second output signal or is less than the magnitude represented by said first output signal.

10. In an X-ray inspection apparatus including a source of X-ray for irradiating an object under inspection; and video apparatus positioned to view a scene resulting from the irradiation of said object and for developing video signals having values representative of a dimension of the irradiated object, and at least horizontal scan synchronizing pulses, the improvement comprising an automatic video processor circuit including;

a video gate coupled to said video apparatus for, upon occurrence of a control signal, developing video output signals having a value representative of the dimension represented by said video signals;

a control circuit coupled to said video gate and said video apparatus and responsive to receipt of said horizontal scan synchronizing pulses from said video apparatus for, upon receipt of a predetermined number of horizontal scan synchronizing pulses, applying said control signal to said video gate for producing said video output signals during a time limited between two successive horizontal synchronizing pulses;

an adjustable reference generator for developing a preselected reference signal representative of a value of said dimension, said reference signal being developed independently of an actual dimension of an object; and, a signal comparator circuit connected to said video gate for comparing said video output signals to said preselected reference and developing an error signal if the value of the video signal attains a predetermined level with respect to the value of the preselected reference signal.

11. An apparatus as defined in claim 10 wherein said adjustable reference generator includes a signal limit generator for developing a reference signal having a value representing a preselected dimension of said object and said comparator circuit includes circuit means for developing an error signal if the dimension represented by said video output signals exceeds the dimension represented by the reference signal developed by said signal limit generator.

12. An apparatus as defined in claim 10 wherein said adjustable reference generator includes a signal limit generator for developing a signal having a value representing a preselected dimension and said comparator circuit includes circuit means for developing an error signal if the dimension represented by said video output signals is less than the dimension represented by the signal developed by said signal limit generator.

13. An apparatus as defined in claim 10 wherein said adjustable reference generator includes a signal limit generator for developing a first output signal having a value representing a preselected width, second signal limit generator means for developing a second output signal representing a preselected width which is greater than that represented by said first signal, and said comparator circuit including circuit means for developing an error signal if the width represented by said video output signals exceeds the width represented by said second output signal or is less than the width represented by said first output signal.

14. Apparatus for inspecting an object comprising:
an electromagnetic radiation source for irradiating the object;
video scanning apparatus positioned to receive radiation from said irradiated object for developing video signals having values representative of a dimension of said object, said video signals including horizontal and vertical synchronization pulses;
a gate coupled to said video apparatus for passing only a preselected portion of said video signals comprising those describing a scan line;
a first reference circuit for developing a lower limit reference signal;
a second reference circuit for developing an upper limit reference signal; and,
a comparator circuit for developing an object error signal if the value represented by said portion of the video signals passed by said gate exceeds the value of said upper limit reference signal or is less than the value of said lower limit reference signal.

15. An apparatus as defined in claim 14 wherein said gate comprises a video gating circuit having an input circuit, a gate circuit and an output circuit, a control circuit for applying a gating signal to said gate circuit at the time of occurrence of only a predetermined portion of said video signals, and converter means for converting said video signals passed by said gate to signals representing a dimensional magnitude of said object.

16. A system for measuring a dimension of an object in an electromagnetic irradiated region, comprising
a. a video scanning apparatus positioned to respond to the radiation in the region to produce video signals bearing information describing at least a portion of an image containing said dimension of the object placed in the region, including brightness signals and synchronizing pulses defining scan lines of the image described by the video signals;
b. circuitry responsive to at least some of the synchronizing signals for selecting a predetermined portion of the video signals describing a scan line of the image described by the video signals, said predetermined portion of said video signals bearing information representing the magnitude of said dimension of said object placed in said region;
c. a reference generator for producing, independently of an actual object, a reference signal having a value representing a magnitude of said dimension, and
d. a comparator connected to the reference generator and the selecting circuitry for producing an error indication when the dimensional magnitudes represented by said reference signal and said predetermined portion of said video signals, respectively, have a predetermined relationship with one another.

17. A system for measuring a dimension of an object in an electromagnetic irradiated region, comprising
a. a video scanning apparatus positioned to respond to the radiation in the region to produce video signals bearing information describing at least a portion of an image containing said dimension of the object placed in the region, including brightness signals and synchronizing pulses defining scan lines of the image described by the video signals;
b. circuitry responsive to at least some of the synchronizing signals for selecting a predetermined portion of the video signals describing a scan line of the image described by the video signals, said predetermined portion bearing information representing the magnitude of said dimension of said object placed in said region;
c. circuitry for causing said video scanning apparatus to repeatedly scan the region a plurality of times;
d. a reference generator for producing a reference signal having a value representing a magnitude of said dimension;
e. a comparator connected to the reference generator and the selecting circuitry for producing an error indication when the magnitudes represented by said reference signal and said predetermined portion of said video signals, respectively, have a predetermined relation between them, and
f. digital weighing circuitry connected to the comparator for producing a second indication only in response to the occurrence of at least a predetermined number of error indications generated in the course of said plurality of repeated scans.

18. A system for measuring a dimension of an object disposed in an electromagnetic irradiated region, comprising
a. a video scanning apparatus positioned to respond to the radiation in the region to produce video signals bearing information describing at least a portion of an image containing said dimension of the object placed in the region, including brightness signals and synchronizing pulses defining scan lines of the image described by the video signals;
b. circuitry responsive to at least some of the synchronizing pulses for selecting a predetermined portion of the video signals describing a scan line of the image described by the video signals, said predetermined portion of video signals indicating the magnitude of said dimension by locating the presence of contrast edges across said scan line indicating edges of the object;
c. trigger circuitry for initiating a signal in response to the indication of a first contrast edge of the object by said portion of video signals, said signal having a duration which is a function of the time elapsed before indication of a second contrast edge of the object, said time lapse being a function of the magnitude of the measured dimension of the object;
d. a limit signal generator connected to said trigger circuitry for generating a limit signal in response to indication of the first contrast edge, said limit signal representing a predetermined magnitude of said dimension; and
e. a comparator connected to the limit signal generator and the selecting circuitry for producing an error indication when the dimensional magnitudes represented by said limit signal and said predetermined portion of said video signals have a predetermined relation to each other.

19. A method for measuring a dimension of an object in an electromagnetic irradiated region, comprising the steps of:
a. producing video signals bearing information describing at least a portion of an image containing said dimension of the object disposed in the region, said video signals including brightness signals and synchronizing pulses defining scan lines of the image described by the video signals;

b. selecting a predetermined portion of the video signals describing a scan line of the image described by the video signals, said predetermined portion of said video signals bearing information representing the magnitude of said dimension of said object disposed in said region;

c. producing, independently of an actual object disposed in said region, a reference signal having a value representing a predetermined magnitude of said dimension;

d. comparing the magnitudes of said dimension represented by said reference signal and said selected portion of video signals, and e. producing an error indication when the dimensional magnitudes represented by said reference signal and said predetermined portion of said video signals, respectively, have one of a range of predetermined relationships to one another.

20. A method for measuring a dimension of an object in an electromagnetic irradiated region, comprising the steps of:

a. producing video signals bearing information describing at least a portion of an image containing said dimension of the object placed in the region, including brightness signals and synchronizing pulses defining scan lines of the image described by the video signals;

b. selecting a predetermined portion of the video signals in response to at least some of the synchronizing signals, said predetermined portion of video signals describing a scan line of the image described by the video signals, said predetermined portion bearing information representing the magnitude of said dimension of said object placed in said region;

c. producing a reference signal having a value representing a predetermined magnitude of said dimension;

d. producing an error indication when the difference between the magnitudes represented by said reference signal and said predetermined portion of said video signals, respectively, have a predetermined relation to one another;

e. repeating steps a) through d) a predetermined plurality of times; and f. producing a second indication only in response to the occurrence of at least a predetermined number of said error indications generated in the course of said plurality of repetition of steps a) through d).

21. A method for measuring a dimension of an object disposed in an electromagnetic irradiated region, comprising the steps of:

a. producing video signals in response to the radiation in the region, said video signals bearing information describing at least a portion of an image containing said dimension of the object placed in the region, said video signals further including brightness signals and synchronizing pulses defining scan lines of the image described by the video signals;

b. selecting a predetermined portion of the video signals describing a scan line of the image described by the video signals, said predetermined portion of said video signals indicating the magnitude of said dimension by locating the presence of contrast edges across said scan line indicating edges of the object;

c. initiating a signal in response to the location of a first contrast edge of the object by said selected portion of video signals, said signal having a duration which is a function of the time elapsed before indication of a second contrast edge of the object, said time lapse being a function of the magnitude of the measured dimension of the object;

d. generating a limit signal in response to indication of the first contrast edge, said limit signal representing a predetermined magnitude of said dimension; and e. producing an error indication when the dimensional magnitudes represented by said limit signal and said predetermined portion of said video signals have a predetermined relation to each other.

* * * * *